US012619426B2

(12) United States Patent
Fang et al.

(10) Patent No.: US 12,619,426 B2
(45) Date of Patent: May 5, 2026

(54) IMPACT ANALYSIS ON SOURCE CODE CHANGE

(71) Applicant: International Business Machines Corporation, Armonk, NY (US)

(72) Inventors: Wu Song Fang, Beijing (CN); Xiao Ling Chen, Beijing (CN); Xinzhe Wang, Beijing (CN); Jing Wang, Beijing (CN); Ting Xie, Beijing (CN); Ji Dong Li, Beijing (CN); Yi Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 17/816,524

(22) Filed: Aug. 1, 2022

(65) Prior Publication Data

US 2024/0053979 A1     Feb. 15, 2024

(51) Int. Cl.
G06F 8/71          (2018.01)
G06F 8/41          (2018.01)
G06F 11/3604       (2025.01)

(52) U.S. Cl.
CPC ................ G06F 8/71 (2013.01); G06F 8/427 (2013.01); G06F 8/433 (2013.01); G06F 11/3604 (2013.01)

(58) Field of Classification Search
CPC ........ G06F 8/427; G06F 8/71; G06F 11/3604; G06F 8/433
See application file for complete search history.

(56) References Cited

U.S. PATENT DOCUMENTS

| | | | |
|---|---|---|---|
| 9,436,582 B1 * | 9/2016 | Paruthi | G06F 11/3608 |
| 9,442,707 B2 * | 9/2016 | Sathyanathan | G06F 8/41 |
| 9,836,390 B2 | 12/2017 | Boshernitsan | |
| 10,331,440 B2 | 6/2019 | Mallisetty | |
| 10,534,604 B1 | 1/2020 | Kimball | |
| 10,789,054 B2 | 9/2020 | Gnazdowsky | |
| 10,963,226 B2 | 3/2021 | Aggarwal | |

(Continued)

FOREIGN PATENT DOCUMENTS

| | | | |
|---|---|---|---|
| CN | 104503917 A | | 7/2017 |
| IN | 202021034020 A | | 2/2022 |
| JP | 2008197982 A | * | 8/2008 |

OTHER PUBLICATIONS

Ren, Xiaoxia, et al., Chianti: A Tool for Change Impact Analysis of Java Programs, OOPSLA '04: Proceedings of the 19th annual ACM SIGPLAN conference on Object-oriented programming, systems, languages, and applications, 2004, 17 pages, [retrieved on Aug. 19, 2025], Retrieved from the Internet: <URL:http://dl.acm.org/>.*

(Continued)

*Primary Examiner* — Geoffrey R St Leger
(74) *Attorney, Agent, or Firm* — James L. Olsen

(57)          ABSTRACT

The method of this disclosure may comprise generating a statement invocation relation for a source code by parsing intermediate representation of the source code produced by a compiler. The method of this disclosure may further comprise in response to a first statement in a first code snippet of the plurality of code snippet being changed, determining affected statements in the source code due to the change of the first statement based on the statement invocation relation.

20 Claims, 5 Drawing Sheets

(56)        References Cited

U.S. PATENT DOCUMENTS

| | | | |
|---|---|---|---|
| 11,200,043 B2 | 12/2021 | Shi | |
| 2003/0084425 A1* | 5/2003 | Glaser ....................... | G06F 8/71 |
| | | | 717/124 |
| 2018/0314519 A1 | 11/2018 | Lee | |
| 2022/0164181 A1* | 5/2022 | Reddy ....................... | G06F 8/71 |

OTHER PUBLICATIONS

Disclosed Anonymously. ( Jan. 3, 2018) Method and System to Evaluate the Impact on Code Changes Between Workspaces, https://priorart.ip.com/IPCOM/000252295.
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

400

GENERATE A STATEMENT INVOCATION RELATION FOR A SOURCE CODE BY PARSING INTERMEDIATE REPRESENTATION OF THE SOURCE CODE PRODUCED BY A COMPILER — S410

IN RESPONSE TO A STATEMENT BEING CHANGED, DETERMINE AFFECTED STATEMENTS IN THE SOURCE CODE BASED ON THE STATEMENT INVOCATION RELATION — S420

500

600

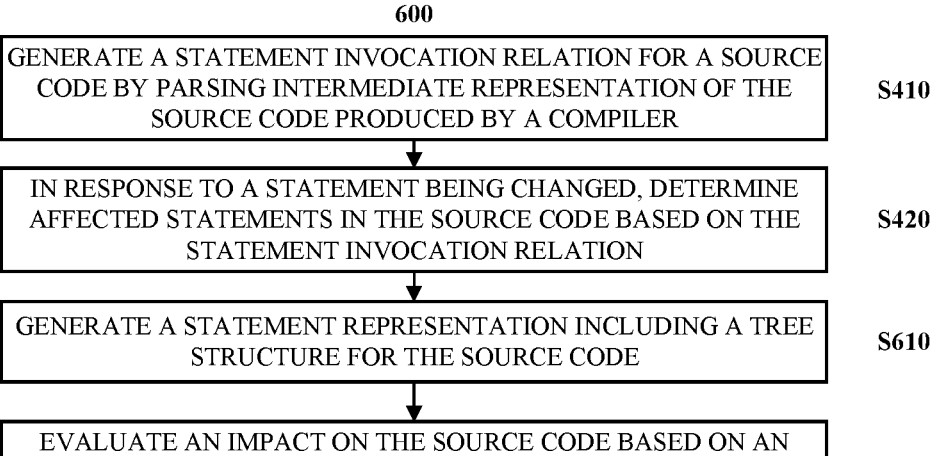

| GENERATE A STATEMENT INVOCATION RELATION FOR A SOURCE CODE BY PARSING INTERMEDIATE REPRESENTATION OF THE SOURCE CODE PRODUCED BY A COMPILER | S410 |

| IN RESPONSE TO A STATEMENT BEING CHANGED, DETERMINE AFFECTED STATEMENTS IN THE SOURCE CODE BASED ON THE STATEMENT INVOCATION RELATION | S420 |

| GENERATE A STATEMENT REPRESENTATION INCLUDING A TREE STRUCTURE FOR THE SOURCE CODE | S610 |

| EVALUATE AN IMPACT ON THE SOURCE CODE BASED ON AN IMPACTED PATH BREADTH AND/OR AN IMPACTED PATH DEPTH OF THE TREE STRUCTURE | S620 |

FIG. 6

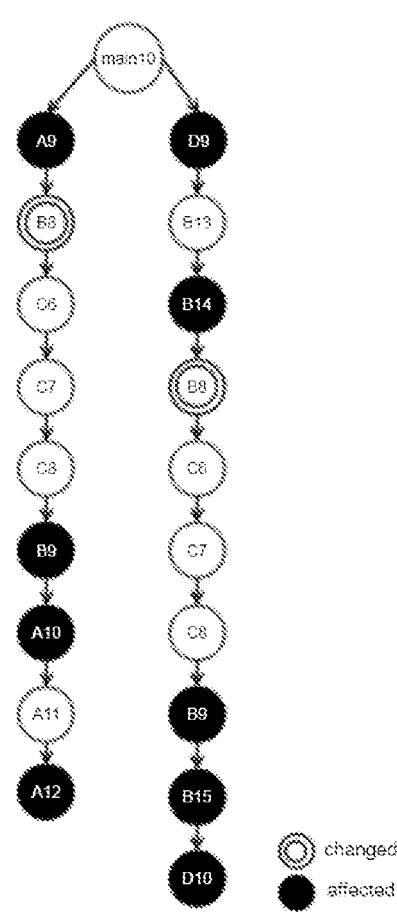

FIG. 7

IMPACT ANALYSIS ON SOURCE CODE CHANGE

BACKGROUND

The present disclosure relates to software development, and more specifically, relates to method/system/computer program product for impact analysis on source code change.

In software development, a developer or tester may add new methods to a source code or change existing methods of the source code to meet different development requirements. The addition or change may have an impact on other portions of the source code. The developer or tester may need to know the impact on source code change to continue the source code development or complete the regression test.

SUMMARY

According to one embodiment of the present disclosure, there is provided a computer-implemented method for impact analysis on a source code change. The method may comprise generating, by one or more processing units, a statement invocation relation for a source code by parsing intermediate representation of the source code produced by a compiler, wherein the source code includes a plurality of code snippets and each of the code snippets includes a plurality of statements, and wherein for a statement in one of the plurality of code snippets, the statement invocation relation associates the statement with invocation information of the statement indicating at least one of statements and code snippets being invoked by the statement. The method may further comprise in response to a first statement in a first code snippet of the plurality of code snippet being changed, determining, by the one or more processing units, affected statements in the source code due to the change of the first statement based on the statement invocation relation, wherein the affected statements include at least one of a second statement in the first code snippet invoking the first statement and a third statement in a second code snippet invoking the first code snippet.

According to another embodiment of the present disclosure, there is provided a system for impact analysis on a source code change which may comprise one or more processors and a memory coupled to at least one of the one or more processors. The system may further comprise a set of computer program instructions stored in the memory and executed by at least one of the one or more processors in order to perform actions of generating a statement invocation relation for a source code by parsing intermediate representation of the source code produced by a compiler, wherein the source code includes a plurality of code snippets and each of the code snippets includes a plurality of statements, and wherein for a statement in one of the plurality of code snippets, the statement invocation relation associates the statement with invocation information of the statement indicating at least one of statements and code snippets being invoked by the statement; and in response to a first statement in a first code snippet of the plurality of code snippet being changed, determining affected statements in the source code due to the change of the first statement based on the statement invocation relation, wherein the affected statements include at least one of a second statement in the first code snippet invoking the first statement and a third statement in a second code snippet invoking the first code snippet.

According to a further embodiment of the present disclosure, there is provided a computer program product. The computer program product may comprise a computer readable storage medium having program instructions embodied therewith. The program instructions may be executable by a device to perform a method for impact analysis on a source code change, comprising: generating a statement invocation relation for a source code by parsing intermediate representation of the source code produced by a compiler, wherein the source code includes a plurality of code snippets and each of the code snippets includes a plurality of statements, and wherein for a statement in one of the plurality of code snippets, the statement invocation relation associates the statement with invocation information of the statement indicating at least one of statements and code snippets being invoked by the statement; and in response to a first statement in a first code snippet of the plurality of code snippet being changed, determining affected statements in the source code due to the change of the first statement based on the statement invocation relation, wherein the affected statements include at least one of a second statement in the first code snippet invoking the first statement and a third statement in a second code snippet invoking the first code snippet.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 6 is a flow chart showing an exemplary computer-implemented method for impact analysis on source code change, according to another embodiment of the present disclosure.

FIG. 7 shows an exemplary tree structure of a statement representation for the source code, according to an embodiment of the present disclosure.

DETAILED DESCRIPTION

Figure 1:
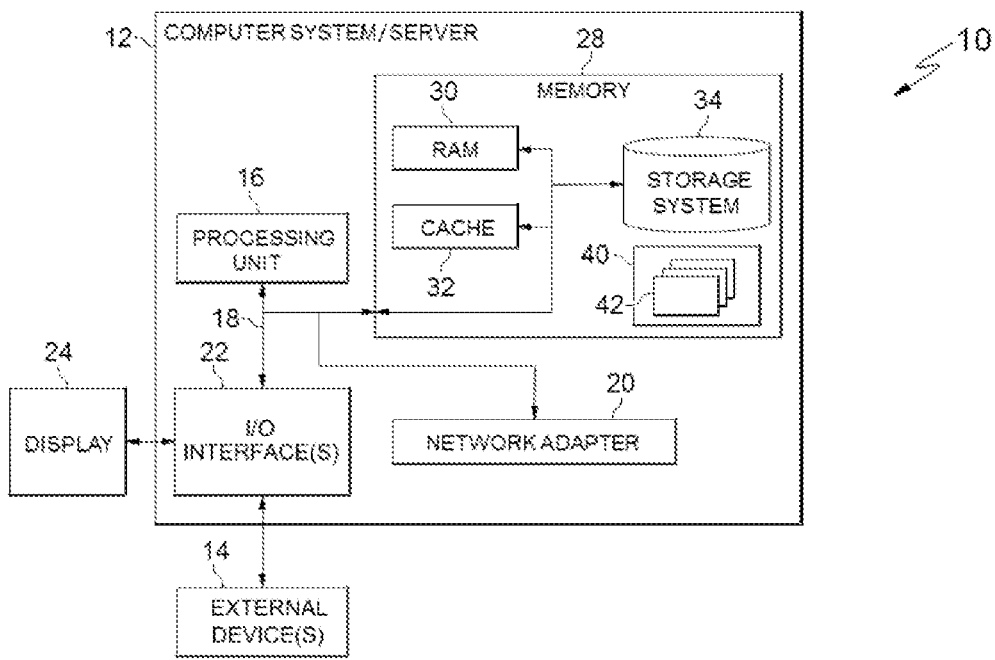
FIG. 1 depicts a cloud computing node, according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
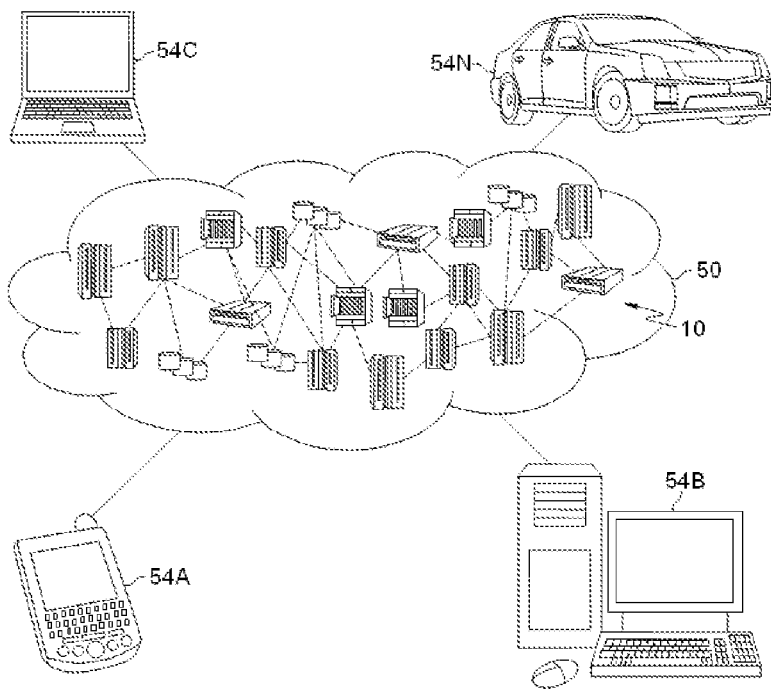
FIG. 2 depicts a cloud computing environment, according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
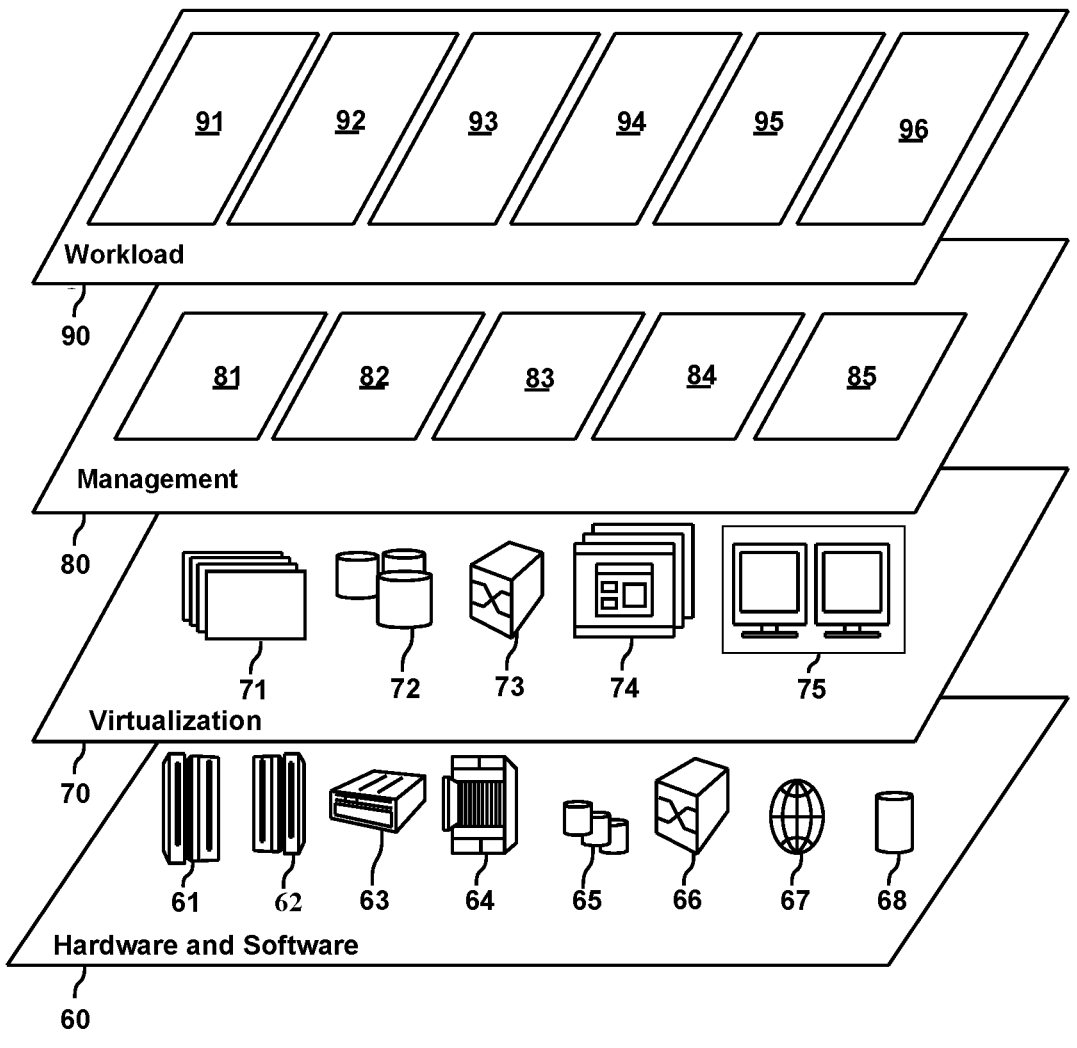
FIG. 3 depicts abstraction model layers, according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and impact analyzing 96.

Some embodiments of the present disclosure may be implemented as the program/utility 40 or the program modules 42 of the computer system/server 12 of FIG. 1, or as the impact analyzing 96 of the workloads layer 90 of FIG. 3.

With reference now to FIGS. 4-8, some embodiments of the present disclosure will be described below.

In a software development, a developer may add new methods to a source code of a project or change existing methods of the source code to meet different development requirements. The addition or change may have an impact on other portions of the source code. The developer may need to know the impact on source code change to continue the source code development. For example, a change in one statement in one method may cause a change in another statement which invokes the changed statement. The developer may need to know which statement(s) are to be changed due to the changed statement, so as to adjust the source code accordingly.

In practice, the source code of a project under development may include a large amount of methods each including a plurality of statements, and invocation relations among these methods and statements may be complex. In this situation, it is not easy for the developer to obtain all impacts caused by new or changed methods, which may lead to an undiscovered impact and may possibly cause unexpected errors.

In order to explain the invocation relations in the source code and the impact due to source code change, the following illustrates four classes A, B, C and D coded in Java each includes one or more methods with invocation relations therebetween. Specifically, class A includes a method A, class B includes methods B1 and B2, class C includes a method C, and class D includes a method D. Further, each method includes a plurality of statements. For the sake of convenience, in the following description, a statement in line L of class M will be denoted as "statement ML". For example, the statement in line 7 in Class C is denoted as "statement C7".

Class A

```
1       package com.emma.java;
2
3       import com.emma.java.ClassB;
4
5       public class ClassA {
6
7           public void A( ) {
8               int a1, a2, b3;
9               a1 = ClassB.B1( ) + 3;
10                a2 = a1 + 10;
11              b3 = 10;
12              System.out.println("a2 + b3 = " + (a2+b3));
13          }
14      }
```

Class B

```
1       package com.emma.java;
2
3       import com.emma.java.ClassC;
4
5       public class ClassB {
6
7           public static int B1( ) {
8               int b1 = ClassC.C( )+1;
9               return b1;
10          }
11
12          public static int B2( ) {
13              int b2;
14              b2 = B1( ) + 2;
15              return b2;
16          }
17      }
```

Class C

```
1       package com.emma.java;
2
3       public class ClassC {
4
5           public static int B {
6               int c = 0;
7               c = c + 3;
8               return c;
9           }
10      }
```

Class D

```
1       package com.emma.java;
2
3       import com.emma.java.ClassB;
4
5       public class ClassD {
6
7           public void D( ) {
8               int d;
9               d = ClassB.B2( ) + 2;
10              System.out.println("d = " + d);
11          }
12      }
```

Assuming that statement C7 is changed, for example, from "c=c+3" to "c=c+5", the impacted methods will be:
    method B1 because it directly invokes method C by statement B8 (B1→C);
    method A because it directly invokes method B1 by statement A9 and thus indirectly invokes method C (A→B1→C);
    method B2 because it directly invokes method B1 by statement B14 and thus indirectly invokes method C (B2→B1→C); and
    method D because it directly invokes method B2 by statement B9 and thus indirectly invokes method C (D→B2→B1→C).

The developer may easily discover that method B1 will be impacted due to the change of the statement C7 based on the relationship "B1→C". Further, an experienced developer may also discover that methods A and B2 will be impacted due to the change of the statement C7 based on the relationships "A→B1→C" and "B2→B1→C". However, the impacted method D may not be easily discovered manually, because the invocation relation is complex and might be ignored by the developer.

During software development, the undiscovered impact may lead to various product problems in customer environment, which may cause bad feedbacks on software product and may effect product iteration. On the other hand, due to the complex invocation relations among methods/statements in the source code, it is hard and time consuming for the developer to manually obtain all the impact of new or changed methods throughout the whole source code.

Therefore, there exists a need to provide an impact analysis on source code change, so as to facilitate the developer during software development.

Figure 4:
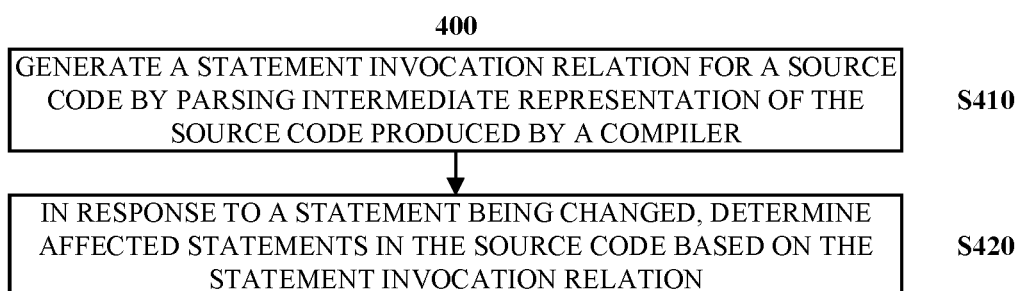
FIG. 4 is a flow chart showing an exemplary computer-implemented method for impact analysis on source code change, according to an embodiment of the present disclosure.

Now refer to FIG. 4, a flow chart showing an exemplary computer-implemented method 400 for impact analysis on source code change according to an embodiment of the present disclosure is illustrated. The method 400 may include a statement invocation relation generating step S410 and an affected statement determining step S420.

In some embodiments, in step S410, one or more processing units generate a statement invocation relation for a source code by parsing intermediate representation of the source code produced by a compiler.

The source code described herein may be a portion of codes in a software project, such as one or more specified methods, files, or packages. Alternatively, the source code may correspond to the whole codes in the project.

Further, the source code may include a plurality of code snippets. The code snippet described herein may be a unit capable of being invoked by a statement in the source code. For example, the code snippet may correspond to a method in the source code (such as methods A, B1, B2, C, or, D as described above). Further, each of the code snippets may include a plurality of statements. A statement described herein may be a command that the developer gives to the computer to be executed, and may be able to invoke another statement (e.g., statement B9 invoking statement B8), be invoked by another statement (e.g., statement B8 being invoked by statement B9) or invoke a code snippet (e.g., statement B8 invoking method C), according to specific development requirements.

In some embodiments, the statement invocation relation generated in step S410 may associate a statement with invocation information of the statement. Further, the invocation information of one statement may indicate at least one of statements and code snippets being invoked by the one statement. For each of a plurality of statements in the source code, invocation information of the statement may be generated, and thus the statement invocation relation including associations of each of the plurality of statements in the source code and the respective invocation information will be obtained.

In some embodiments, the statement invocation relation may be generated by parsing intermediate representation of the source code produced by a compiler. A compiler described herein may be a software program that translates a high-level source language program (e.g., the source code developed by the developer) into a form ready to execute on a computer. The compiler may produce intermediate representation (IR) to manage the complexity of the compilation process. The IR can represent the high-level source code without loss of information so that its execution can be conducted accurately.

In some embodiments, the IR used in the present disclosure may be directly obtained from the compiler. In some other embodiments, depending on different compilers or different source code languages, the IR may be obtained by disassembling computer executable binary content into information (e.g., text) that is easy to understand and parse, for example, using existing development tools.

Figure 5:
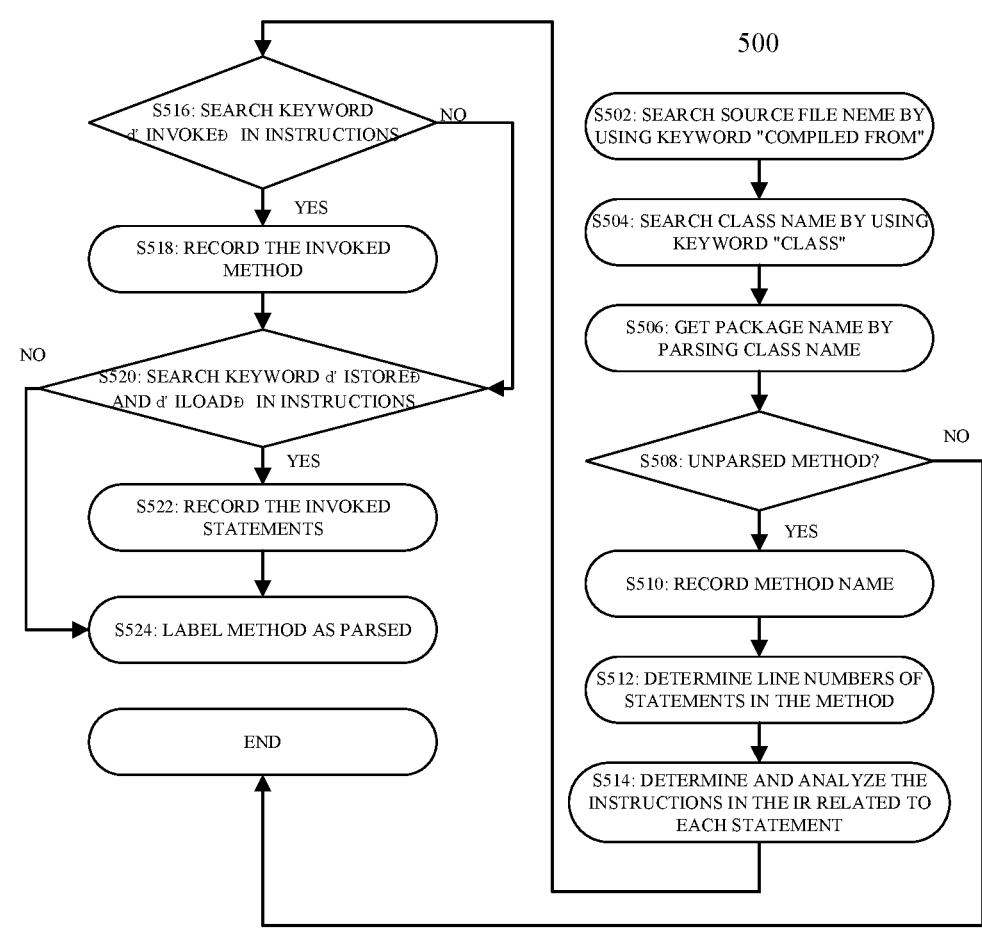
FIG. 5 is a flow chart showing an exemplary computer-implemented method for generating statement invocation relation, according to an embodiment of the present disclosure.

FIG. 5 is a flow chart showing an exemplary method 500 for generating the statement invocation relation by parsing the IR according to some embodiments of the present disclosure. The method 500 is an exemplary implementation of the statement invocation relation generating step S410. In the following, an example of an IR of the above recited Class A will be introduced to explain the statement invocation relation generation step according to some embodiments of the present disclosure. It should be noted that only a portion of the IR related to the present disclosure is shown, and other portions of the IR are omitted herein.

Intermediate Representation of Class A

```
Compiled from "ClassA.java"
  public class com.emma.java.ClassA
  minor version: 0
  major version: 52
  flags: ACC_PUBLIC, ACC_SUPER
  ......
{
  public void A( );
    descriptor: ( )V
    flags: ACC_PUBLIC
    Code:
      stack=4, locals=4, args_size=1
        0: invokestatic #2          // Method com/emma/java/ClassB.B1:( )I
        3: iconst_3
        4: iadd
        5: istore_1
        6: iload_1
        7: bipush        10
        9: iadd
        10: istore_2
        11: bipush        10
        13: istore_3
        14: getstatic #3    // Field java/lang/System.out:Ljava/io/PrintStream;
        17: new #4        // class java/lang/StringBuilder
        20: dup
        21: invokespecial #5        // Method java/lang/StringBuilder."<init>":( )V
        24:ldc #6      // String a2 + b3 =
        26: invokevirtual #7        // Method java/lang/StringBuilder.append:
                                    (Ljava/lang/String;)Ljava/lang/StringBuilder;
```

```
    29: iload_2
    30: iload_3
    31: iadd
    32: invokevirtual #8        // Method java/lang/StringBuilder.append:(I)Ljava/lang/StringBuilder;
    35: invokevirtual #9        // Method java/lang/StringBuilder.toString:( )Ljava/lang/String;
    38: invokevirtual #10       // Method java/io/PrintStream.println:(Ljava/lang/String;)V
    41: return
  LineNumberTable:
    line 9: 0
    line 10: 6
    line 11: 11
    line 12: 14
    line 13: 41
}
```

As shown in FIG. 5, in some embodiments, the steps S502-S512 may be performed to determine an identity of each statement in a code snippet of the source code. In the following description, a method is described as an example of the code snippet. It should be noted that the code snippet of the present disclosure is not limited to a method, but may be one or more methods, classes, files and packages in the source code having invocation relations with other code snippets.

In some embodiments, the identity of each statement the method may be determined based on syntactic analysis on the IR. The identity of the statement may include at least one of the package name, source file name, class name, method name, and line number in the method, etc. Further, the identity of the statement is not limited to the above described information, and may include less information or other information as long as it can uniquely determine the statement.

In some embodiments, in step S502, one or more processing units may search a source file name in the IR by using a keyword "Compiled from". After the search, a source file name "ClassA.java" may be found from "Compiled from "ClassA.java" in the IR shown above.

In step S504, one or more processing units may search a class name in the IR by using a keyword "class". After the example, in the IR, "public void A( )" is found and the method name is recorded as A( ). If there is no unparsed method in step S508, which means all methods in the IR have already been parsed, the process proceeds to end.

In step S512, one or more processing units may determine line numbers of the statements in the method. In some embodiments, "LineNumberTable" in the IR may be parsed to obtain the line number of each statement method. For example, lines 9-13 are shown in the "LineNumberTable", which means that the method A includes statements in lines 9-13 of class A.

By using the above syntactic analysis on the IR in steps S502-S512, the identities of all statements in the source code may be obtained. It should be noted that the above steps S502-S512 describe keyword-searching related syntactic analysis on the IR, the present disclosure is not limited to this, and other syntactic analysis on the IR may also be applied as long as it can determine the identities of the statements in the source code.

In some embodiments, the identity of each statement may be recorded in a statement invocation relation table, which is an exemplary implementation of the statement invocation relation of the present disclosure. Table 1 below illustrates in columns 1-5 the identity of each statement, including package, source file, class and line number of each statement.

TABLE 1

|  | | | | | | | |
| --- | --- | --- | --- | --- | --- | --- | --- |
| Statement Invocation Relation Table | | | | | | | |
| package | source file | class | method | line number | instructions | invoked methods | invoked statements |
| com.emma.java | ClassA.java | Class A | A( ) | 9 | 0-5 | com/emma/java/ClassB.B1 | null |
|  |  |  |  | 10 | 6-10 | null | 9 |
|  |  |  |  | 11 | 11-13 | null | null |
|  |  |  |  | 12 | 14-38 | java/lang/StringBuilder | 10, 11 |
|  |  |  |  | 13 | 41 | null | null |
|  | ClassB.java | Class B | B1( ) | 8 | 0-5 | com/emma/java/ClassC.C | null |
|  |  |  |  | 9 | 6-7 | null | 8 |
|  |  |  | B2( ) | 14 | 0-5 | B1( ) | null |
|  |  |  |  | 15 | 6-7 | null | 14 | search, a class name "ClassA" may be found from "public class com.emma.java.ClassA" in the IR shown above.

In step S506, one or more processing units may parse the class name to get the package name. For example, as shown "public class com.emma.java.ClassA" in the IR, the prefix "com.emma.java" may be obtained as the package name.

In step S508, one or more processing units may determine whether there is unparsed method, e.g., by searching "public void" in the IR. If there is unparsed method, the process proceeds to step S510 to record the method name. For Referring back to FIG. 5, steps S514-S524 relate to obtaining of invocation information of each statement. In some embodiments, the invocation information of a statement may indicate statements and/or methods being invoked by the statement. The invoked statements may show inner-relation between different statements within the same method, while the invoked methods may show inter-connection between different methods. In some embodiments, syntactic analysis may be performed to obtain the invocation information.

In step S514, one or more processing units may determine and analyze instructions in the IR related to each statement in the method. In some embodiments, "LineNumberTable" in the IR may be parsed to obtain the correspondence of each statement with instructions in the IR. For example, according to "LineNumberTable", statement A9 corresponds the instructions starting from 0 and ending before 6, i.e., the instructions 0-5. Further, statement A10 corresponds to the instructions starting from 6 and ending before 11, i.e., the instructions 6-10. Further, the determined instructions in the IR may be analyzed. For example, for statement A9, the related instructions 0-5 are analyzed. For other statements in method A, a similar process may be performed.

In some embodiments, the correspondence of each statement with the instructions in the IR may be recorded in the statement invocation relation table, for example, in columns 5 and 6 of Table 1, wherein column 5 records the line number of each statement and column 6 records the related instructions in the IR. In some other embodiments, column 6 may be omitted in the table.

Steps S516-S518 relate to determining of methods invoked by a statement. In step S516, one or more processing units may search a keyword "invoke" in the determined instructions. For example, for statement A9, the related instructions 0-5 in the IR are searched. It is found that the keyword "invoke" is included in instruction 0 in IR. Therefore, it can be determined that a method is invoked by statement A9. The specific method invoked by statement A9 may be obtained by further parsing instruction 0. For example, from the annotation in instruction 0, the invoked method "com/emma/java/ClassB.B1" may be obtained. In step S518, one or more processing units may record the invoked method, for example in the statement invocation relation table in association with statement A9 (see column 7 "invoked methods" in Table 1). The same processes in steps S516 and S518 may be performed to obtain invoked methods for the rest statements.

Further, steps S520-S522 relate to determining of statements invoked by a statement. In step S520, one or more processing units may search the keywords "iload" and "istore" in the instructions in IR. These two keywords relate to loading and storing of a value and may be used to indicate invoked statements. For example, for statement A10, the instructions 6-10 in the IR are searched. the keyword "iload" is found in instruction 6, which corresponds to the instruction 5 (including the corresponding "istore_1") related to statement A9. Therefore, it is found that statement A9 is invoked by statement A10. It is understood that these two keywords "iload" and "istore" are examples in the IR. For different IRs, other keywords may be used for determining of invoked statements.

In step S522, one or more processing units may record the found statements in the statement invocation table, for example, in column 8 "invoked statements" in Table 1. The same processes in steps S520 and S522 are performed to obtain other invoked statements.

In step S524, one or more processing units may label the parsed method (e.g., method A), and the method 500 will end until all methods in the source code are parsed.

The above Table 1 illustrates the statement invocation relation table for statements in methods A, B1 and B2, which may be obtained by the steps in method 500 described above.

By using the method 500, a statement invocation relation table which associates each statement in the source code and the respective invocation information may be obtained, which may facilitate the impact analysis on source code change.

In the above steps 516 and S520 in the method 500, keyword-searching related syntactic analysis is performed on the respective instructions to obtain the invocation information. It should be noted that the present disclosure is not limited to this, and other syntactic analysis on the instructions in the IR may also be applied as long as it can determine the invocation information.

In the present disclosure, the statement invocation relation is illustrated in the form of table in the description. However, it should be noted that the form for the statement invocation relation is not limited to the form of table and can be any other forms, as long as it can provide associations of the statements with the invocation information of the statements.

Referring back to FIG. 4, in step S420, one or more processing units, in response to a statement in the source code being changed, may determine affected statements in the source code based on the statement invocation relation.

Change of a statement described in this disclosure means any of the statement being newly added, another statement invoking the statement being deleted, or the assignment of the statement being changed. As an example, it is assumed that the statement change occurs in method B1 of class B, for example, statement B8 (also recited as "the first statement") is changed from "int b1=ClassC.C( )+1" to "int b1=ClassC.C( )+10".

In some embodiments, the affected statements may be determined within the method including the first statement (e.g., statement B8). Specifically, a second statement in the method (e.g., method B1) invoking the first statement (e.g., statement B8) may be determined as an affected statement. In some embodiments, the column "invoked statements" in the statement invocation relation table may be traversed to find the second statement. For example, as indicated by the statement invocation table (column "invoked statements" in Table 1), statement B9 invokes statement B8. Therefore, statement B9 may be determined as an affected statement.

In some embodiments, the affected statements may be determined from other methods. Specifically, a third statement in a second method (e.g., method B2) invoking the first method (e.g., method B1) may be determined as an affected statement. In some embodiments, the column "invoked methods" in the statement invocation relation table may be traversed to find the first method. For example, as indicated by the invocation relation table (column "invoked methods" in Table 1), the method B1 is invoked by statement B14 (also recited as "the third statement") of method B2. Therefore, statement B14 in method B2 may be determined as an affected statement due to the change within method B1. In addition, B1 is also invoked by statement A9, and statement A9 may be determined as an affected statement.

In some embodiments, because the affected third statement (e.g., statement B14 or A9) may be changed due to the change of the first statement (e.g., statement B8), the third statement may be regarded as a changed statement so as to determine further affected statements. In other words, similar process may be performed to determine affected statements in response to the third statement being changed/affected.

In some embodiments, a matrix operation may be provided to calculate for the affected statements.

Specifically, a statement invocation matrix $R=[r_{ij}]_{N \times N}$ may be generated based on the statement invocation relation, wherein $i, j=1, \ldots, N$, and N denotes the total lines of statements in the source code, $r_{ij}=1$ denotes a statement in line i directly invokes a statement in line j, otherwise $r_{ij}=0$. The value of $r_{ij}$ may be obtained from the statement invocation relation table, e.g., columns "invoked methods" and "invoked statements". Further, all statements in the source code are numbered in sequence, for example, in the order of execution of the source code. An exemplary statement invocation matrix R may be expressed as:

$$R = \begin{pmatrix} 0 & \cdots & 0 \\ 1 & \cdots & 0 \\ \vdots & \ddots & \vdots \\ 0 & \cdots & 1 \\ 0 & \cdots & 0 \end{pmatrix}$$

Further, a changed statement vector $C=(c_1, \ldots, c_k, \ldots, c_N)^T$ may be generated, wherein $k=1, \ldots, N$, $c_k=1$ denotes a statement k is changed, otherwise $c_k=0$. An exemplary changed statement vector C may be expressed as:

$$C = \begin{pmatrix} 0 \\ 0 \\ 0 \\ 0 \\ 0 \\ 1 \\ 0 \\ \cdots \\ 0 \end{pmatrix}$$

elements in the calculated vectors $E_2$, $E^3$, ... become zero. In other words, the vectors $E^1$, $E^2$, $E^3$, ... may be assigned to the vector C to calculate E=RC until all elements in the vector E become zero. By the above-described matrix operation, all directly and indirectly affected statements due to a statement change may be obtained.

According to method 400 for impact analysis, the affected statements due to a statement change may be determined. Therefore, the developer may easily obtain all the impact due to the statement change, and thus the impact analysis of method 400 may facilitate the software development.

In some embodiments, the changed statements and the affected statements may be flagged and recorded in the statement invocation relation table, see Table 2 below for example, so as to provide a clearer presentation of changed/affected statements in the source code. Specifically, if a statement is changed (e.g., statement B8), the "changed flag" of the statement is recorded in Table 2 as "1". Further, if a statement is affected (e.g., statements B9, B14, B15, A9, A10, A12), the "affected flag" of the statement is recorded in Table 2 as "1". The developer may refer to the changed flag and the affected flag to clearly know the impact due to the statement change.

TABLE 2

| | | | | | | | Statement Invocation Relation Table with Changed/Affected Flags | | | | |
| package | source file | class | method | line number | instructions | invoked methods | invoked statements | new flag | changed flag | affected flag |
|---|---|---|---|---|---|---|---|---|---|---|
| com.emma.java | ClassA.java | Class A | A( ) | 9 | 0-5 | com/emma/java/ClassB.B1 | null | 0 | 0 | 1 |
| | | | | 10 | 6-10 | null | 9 | 0 | 0 | 1 |
| | | | | 11 | 11-13 | null | null | 0 | 0 | 0 |
| | | | | 12 | 14-38 | java/lang/StringBuilder | 10, 11 | 0 | 0 | 1 |
| | | | | 13 | 41 | null | null | 0 | 0 | 0 |
| | ClassB.java | Class B | B1( ) | 8 | 0-5 | com/emma/java/ClassC.C | null | 0 | 1 | 0 |
| | | | | 9 | 6-7 | null | 8 | 0 | 0 | 1 |
| | | | B2( ) | 14 | 0-5 | B1( ) | null | 0 | 0 | 1 |
| | | | | 15 | 6-7 | null | 14 | 0 | 0 | 1 |

Further, an affected statement vector $E^1=RC$ may be calculated to obtain affected statements which correspond to non-zero elements in the vector $E^1$.

$$E^1 = RC = \begin{pmatrix} 0 & \cdots & 0 \\ 1 & \cdots & 0 \\ \vdots & \ddots & \vdots \\ 0 & \cdots & 1 \\ 0 & \cdots & 0 \end{pmatrix} \begin{pmatrix} 0 \\ 0 \\ 0 \\ 0 \\ 0 \\ 1 \\ 0 \\ \cdots \\ 0 \end{pmatrix} = \begin{pmatrix} 0 \\ 0 \\ 0 \\ 0 \\ 0 \\ 0 \\ 1 \\ \cdots \\ 0 \end{pmatrix}$$

The above vector $E^1$ may denote the directly affected statements. Further, $E^2=RE^1$, $E^3=RE^2$, ..., may be calculated to determine the indirectly affected statements, until all In the above description, an example that only one statement invocation relation table for the source code is generated is discussed. It should be noted that the present disclosure is not limited to this, and a plurality of statement invocation relation tables may be generated for different methods, classes, source files, or packages, and the impact analysis according to the present disclosure may be performed on the plurality of statement invocation relation tables.

In some embodiments, if there are statement changes in the source code, the changed statements may be determined, and the statement invocation relation table may need to update accordingly.

In some embodiments, in response to the source code being updated, one or more changed statements may be determined based on the updated source code. The update of source code may be discovered by resubmission of the source code. Further, the source code changes may be obtained by comparing the previous version of source code with the newly submitted version of source code. In some embodiments, the changed statements according to the present disclosure may include at least one of a newly added statement, a statement invoking a deleted statement, and a statement with a changed assignment.

In some embodiments, if there are new files added in a project, the step S410 in method 400 may be performed on the source code included in the new files, so as to obtain a statement invocation relation for the newly added source code. Further, the statements in the newly added source code may be determined as changed statement, e.g., the changed flags for these statements may be set to "1".

In some embodiments, if some new statements are added into the existing source code, the invocation information of the newly added statements may be generated and added into the statement invocation relation based on step S410. Further, the newly added statements may be determined as changed statements, e.g., the changed flags for these statements may be set to "1". Further, the "line number" column in the statement invocation relation table may be changed by comparing the source codes before and after the change.

In some embodiments, if some statements are deleted from the source code, the statements invoking the deleted statement may be determined based on the statement invocation relation, and these statements may be determined as affected statements, e.g., the affected flags for these statements may be set to "1". Alternatively, the statements invoking the deleted statements may be determined as changed statements, e.g., the changed flags for these statements may be set to "1". Further, the "line number" column in the statement invocation relation table may be changed by comparing the source codes before and after the deletion.

In some embodiments, if a statement itself is changed, e.g., the assignment to the statement is changed (for example, statement B8 is changed from "int b1= ClassC.C( )+1" to "int b1=ClassC.C( )+10"), the statement may be determined as a changed statement, e.g, the changed flags for these statements may be set to "1".

In the above description, the newly added statements and the statements with changed assignments are treated the same, both are mentioned as changed statements. In some embodiments, the two kinds of statements may be treated differently. For example, for the newly added statements, "new flag" may be set to distinguish from the statements with changed assignments for which "changed flags" are set. Similarly, the changed statements due to the deletion of other statements may be distinguished from other changed statements.

In some embodiments, after determining the changed statements, the statement invocation relation may be updated. For example, the updated source code may be recompiled to obtain updated IR, and the columns "instructions", "invoked methods", "invoked statements" may be updated based on the updated IR. Further, the affected statements may be determined based on the updated statement invocation relation. For example, the affected statements may be obtained based on the updated columns "invoked methods", "invoked statements", "changed flag", "affected flag".

FIG. 6 is a flow chart showing an exemplary computer-implemented method 600 for impact analysis on source code change according to another embodiment of the present disclosure. In method 600, the same steps S410 and S420 are included. In addition, the method 600 includes step S610, and may further include step S620.

In step S610, one or more processing units may generate a statement representation for the source code. In some embodiments, the statement representation may include a tree structure. The tree structure may include a plurality of nodes each corresponding to a statement of the source code. In some embodiments, the order of the nodes in the tree structure may be determined based on the execution order of the statements in the source code. For example, a child node for one node in the tree structure may correspond to a next statement in the source code which is to be executed after the statement corresponding to the one node.

In some embodiments, the tree structure may be displayed by a graphical user interface (GUI) or editor tools and present to the developer, so as to facilitate the developer to understand the structure of the source code intuitively.

An exemplary tree structure of the statement representation for the source code is shown in FIG. 7. In the tree structure, there is a root node, two leaf nodes and a plurality of other nodes. In some embodiments, the root node may correspond to an entry of the source code, such as the first executed statement in the main method.

The following shows an exemplary class main including the method main coded in Java. The first executed statement in the method main is the statement in line 10, therefore, the root node in the tree structure shown in FIG. 7 is denoted as "main10".

Class Main

```
1       package com.emma.java;
2
3       import com.emma.java.ClassA;
4       import com.emma.java.ClassD;
5
6       public class Main {
7
8          public static void main(String[ ] args) {
9
10             if(args.toString( ).equals("ClassA")) {
12                ClassA.A( );
13             } else {
14                ClassD.D( );
15             }
16          }
17       }
```

Further, according to the method main, the next statement to be executed would be the statement in line 12 or 14, which corresponds to the invocation of method A or D respectively. Therefore, the child node of the root node may be determined as node "A9" and node "D9", corresponding to statements A9 and D9 which are firstly executed in methods A and D respectively. By this means, for each node, the child node may be determined, until the leaf nodes A12 and D10, which correspond to the lastly executed statements in methods A and D respectively.

In some embodiments, in the tree structure, the nodes corresponding to the changed and/or affected statements may be highlighted. For example, as shown in FIG. 7, the nodes corresponding to the changed statements are highlighted as double circle, and the nodes corresponding to the affected statements are highlighted as black nodes. By highlighting the nodes corresponding to changed and/or affected statements, the developer would intuitively obtain the statements which may pay special attention to. Further, during the software development, the affected statements are usually easier to be ignored compared to the changed statements. Therefore, by highlighting the nodes corresponding to the affected statements in a different way as the nodes corresponding to the changed statements, it would be easier to draw the developer's attention, so as to facilitate the software development.

In some embodiments, the generation of the statement representation including the tree structure may be performed based on the statement invocation relation (e.g., the statement invocation relation Table 1 or 2) obtained by the above-described method 400. The details may be described with reference to FIG. 8.

Figure 8:
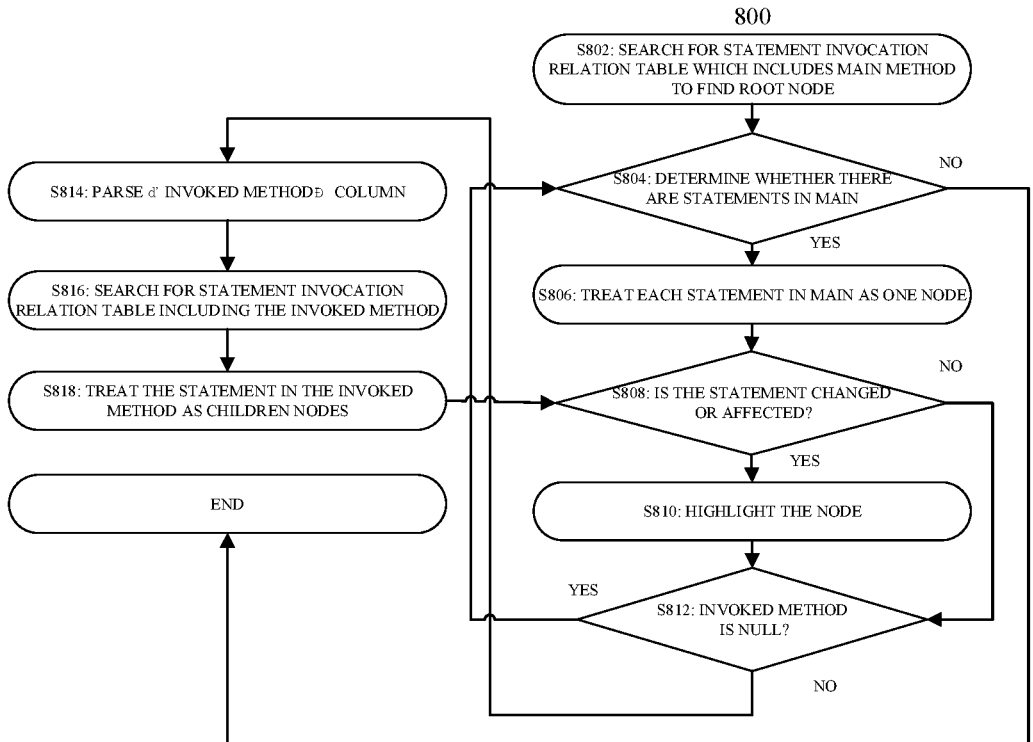
FIG. 8 is a flow chart showing an exemplary computer-implemented method for generating the statement representation based on the statement invocation relation, according to an embodiment of the present disclosure.

FIG. 8 is a flow chart showing an exemplary computer-implemented method 800 for generating the statement representation based on the statement invocation relation according to an embodiment of the present disclosure. It should be noted that in method 800, it is assumed that different methods may be recorded in different statement invocation relation tables. However, the method 800 may be similarly applied in the case of one statement invocation relation table for the whole source code.

In step S802, one or more processing units may search a statement invocation relation table which includes the main method to find the root node. In some embodiment, a keyword "main" may be searched in column "method" of a plurality of statement invocation relation tables to find the statement invocation relation table including method main. Further, the first stored line number in column "line number" of method main may correspond to the statement which is firstly executed in the method main. Therefore, for example, the root node "main10" may be determined.

In step S804, one or more processing units may determine whether there are statements in method main. This can be done by traversing the column "line number" in method main of the statement invocation relation table. If there are no statements in method main, the process proceeds to end. Otherwise, the process proceeds to step S806 to treat each statement in the method main as one node. For example, there are two statements "ClassA.A( )" and "ClassD.D( )" in method main, and the two statements may be treated as two nodes corresponding to the statements in method A and D respectively. Further, the statement invocation relation table including method A is searched to determine the line number of the firstly executed line of method A. As shown in Table 1 or 2, line number "9" may be obtained. Therefore, a child node of the root node may be determined as "A9". Similarly, another child node "D9" may be determined.

In step S808, one or more processing units may determine whether the statement is changed or affected. For example, for the node "A9", the columns "changed flag" and "affected flag" may be checked to determine whether the statement corresponding to the node "A9" is changed or affected. As can be seen from Table 2, statement A9 is affected, and thus in step S810, the node "A9" is highlighted as "affected", as shown in FIG. 7. Otherwise, if it is determined in step S808 that the statement is not changed or affected, the node is not highlighted and the process proceeds to step S812.

In step S812, one or more processing units may determine whether the column "invoked method" of the statement corresponding to the node (e.g., "A9") is null. If yes, the process proceeds back to step S804 to check a next statement in the method main. Otherwise, the process proceeds to step S814 to parse the column "invoked method" to obtain the identity of the invoked method such as the package, source file, class and method name. For example, the column "invoked method" for statement A9 (corresponding to node "A9") is "com/emma/java/ClassB.B1", which means statement A9 invokes method B1.

In step S816, one or more processing units may search the statement invocation relation table including the method obtained in step S814 (e.g., method B1), based on the identity of the method.

In step S818, one or more processing units may treat the statements in the method recorded in the statement invocation relation table searched in step S816 as children nodes of the node in step S806. For example, statement B8 may be treated as a child node "B8" of "A9". In addition, it is further determined whether the child node corresponds to a changed and/or affected node in step S808. If yes, this child node may be highlighted. Since the "changed flag" of node "B8" is "1", "B8" is highlighted in FIG. 7 as a changed node.

By performing the method 800, the tree structure as shown in FIG. 7 will be generated.

In some embodiments, a structure "tree node" may be generated for each statement based on the statement invocation relation, and the tree structure may be generated based on the structures of the statements in the source code. The structure "tree node" may include the identity of the statement (including package name, source file name, class name, method name, line number, etc.), the highlight attribute, and the corresponding child node and parent node. The following shows an exemplary structure "tree node" for node "B8".

```
Tree node
{
    package: com.emma.java,
    source file: ClassB.java,
    class: ClassB,
    method: B1( ),
    line number: 8,
    highlight: "changed",
    ChildNode: C6,
    ParentNode: A9
}
```

In some embodiment, the tree structure may be used to evaluate an impact on the source code due to the statement change. The evaluation is illustrated in step S620 of FIG. 6.

Specifically, in step S620, one or more processing units may evaluate an impact on the source code due to the change of a statement based on at least one of an impacted path breadth or an impacted path depth of the tree structure.

In some embodiments, the impacted path breadth may be a count of impacted paths in the tree structure, wherein each of the impacted paths includes at least one highlighted node. For example, as in the tree structure shown in FIG. 7, there are two paths, i.e., path 1 "main10→A9→B8→C6→C7→C8→B9→A10→A11→A12" and path 2 "main10→D9→B13→B14→B8→C6→C7→C8→B9→B15→B10". In both paths, there are highlighted node. Therefore, the impacted path breadth may be "2".

In some embodiments, it is considered that the wider the breadth (i.e., the bigger the value of the breadth), the more impact for different areas in the source code would be. Therefore, the impacted path breadth may be used for evaluation the impact on the source code due to statement change.

In some embodiments, the impacted path depth may be a maximum depth of impacted paths in the tree structure. A depth of an impacted path may be a count of nodes in the impacted path from a first highlighted node to a last highlighted node. For example, in path 1 of the tree structure shown in FIG. 7, the impacted path depth of path 1 is the count of nodes from "A9" (the first highlighted node) to "A12" (the last highlighted node), which equals to "9". For path 2, the impacted path depth is the node count from "D9" to "D10", which equals to "10". Therefore, the impacted path depth would be max {9, 10}=10.

In some embodiments, the deeper the impacted path depth (i.e., the bigger the value of the impacted path depth), the more impact for upstream and downstream of the source code invocation would be. Therefore, the impacted path depth may be used for evaluation the impact on the source code due to statement change.

In addition, the impacted path breadth and depth would be used together to obtain a comprehensive evaluation for the impact on the source code due to a statement change.

In some embodiments, one or more of elements related to the impact may be output through GUI for example as a reference for the developer. For example, the following impact table (Table 3) may be generated and output to the developer. Table 3 shows the changed method B1 due to the change of statement B8, together with the impacted packages, impacted files, impacted classes, impacted methods, impacted statements, impacted path depth and impacted path breadth due to the change. The values of these elements may be obtained based on the above-described impact analysis/evaluation according to the present disclosure. It should be noted that some of the elements shown in Table 3 may be omitted according to actual need. Further, some elements may be further added in Table 3 for impact evaluation.

In the above description, the source code written in Java is illustrated. It should be noted that the present disclosure does not limited to Java, but can be applied to other programming languages, including but not limited to C, C++, Python, etc.

It should be noted that the processing of impact analysis according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

According to an embodiment of the present disclosure, there is provided a system for impact analysis on source code change. The system may comprise one or more processors and a memory coupled to at least one of the one or more processors. The system may further comprise a set of computer program instructions stored in the memory and executed by at least one of the one or more processors in order to perform actions of generating a statement invocation relation for a source code by parsing intermediate representation of the source code produced by a compiler, wherein the source code includes a plurality of code snippets and each of the code snippets includes a plurality of statements, and wherein for a statement in one of the plurality of

TABLE 3

| | Impact Table | | | | | | |
|---|---|---|---|---|---|---|---|
| Changed method | Impacted packages | Impacted files | Impacted classes | Impacted methods | Impacted statements | Depth | Breadth |
| com.emma.jave.ClassB.B1( ) | com.emma.java | ClassB.java | ClassB | B1( )<br>B2( ) | 8, 9<br>14, 15 | 10 | 2 |
| | | ClassA.java | ClassA | A( ) | 9, 10, 11, 12 | | |
| | | ClassD.java | ClassD | D( ) | 9, 10 | | |
| | 1 | 3 | 3 | 4 | 10 | | |

In software development, a tester may be responsible for testing the source code developed by the developer to improve and ensure the quality of the source code. In some situations, the tester would program test cases for regression test of the source code. In these situations, if the source code is changed, the test cases would also likely be affected. The impact analysis/evaluation on source code change according to the present disclosure may also be applied to the impact analysis on test code related to the source code.

In some embodiments, in response to a statement in a source code being changed, affected test cases for testing the source code may be determined based on the statement invocation relation. In some embodiments, a test case invoking a method which includes a changed statement and/or one or more affected statements may be determined as an affected test case.

For example, according to the statement invocation relation table (e.g., Table 2), due to the change of statement B8, the method B1 may be changed because it includes the changed statement B8. Therefore, a test case invoking the method B1 may be determined as an affected test case. Further, due to the change of statement B8, the methods A and B2 may be affected because they include affected statements. Therefore, a test case invoking method A or B2 may be determined as an affected test case. By this means, impacted test cases may be provided to the tester so as to facilitate the regression test of the source code.

code snippets, the statement invocation relation associates the statement with invocation information of the statement indicating at least one of statements and code snippets being invoked by the statement; and in response to a first statement in a first code snippet of the plurality of code snippet being changed, determining affected statements in the source code due to the change of the first statement based on the statement invocation relation, wherein the affected statements include at least one of a second statement in the first code snippet invoking the first statement and a third statement in a second code snippet invoking the first code snippet.

According to an embodiment of the present disclosure, there is provided a computer program product. The computer program product may comprise a computer readable storage medium having program instructions embodied therewith. The program instructions may be executable by a device to perform a method for impact analysis on a source code change, comprising: generating a statement invocation relation for a source code by parsing intermediate representation of the source code produced by a compiler, wherein the source code includes a plurality of code snippets and each of the code snippets includes a plurality of statements, and wherein for a statement in one of the plurality of code snippets, the statement invocation relation associates the statement with invocation information of the statement indicating at least one of statements and code snippets being invoked by the statement; and in response to a first statement in a first code snippet of the plurality of code snippet being changed, determining affected statements in the source code due to the change of the first statement based on the statement invocation relation, wherein the affected statements include at least one of a second statement in the first code snippet invoking the first statement and a third statement in a second code snippet invoking the first code snippet.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
generating, by one or more processing units, a statement invocation relation table for a source code by parsing intermediate representation of the source code produced by a compiler, wherein the source code includes a plurality of code snippets and each of the code snippets includes a plurality of statements, and wherein for a statement in one of the plurality of code snippets, the statement invocation relation table associates the statement with invocation information of the statement indicating statements and code snippets being invoked by the statement; and
in response to a first statement in a first code snippet of the plurality of code snippets being changed, determining, by the one or more processing units, affected statements in the source code due to the change of the first statement based on the statement invocation relation table, wherein the affected statements include a second statement in the first code snippet invoking the first statement and a third statement in a second code snippet invoking the first code snippet.

2. The computer-implemented method according to claim 1, wherein the generating the statement invocation relation table comprises:
determining, by the one or more processing units, one or more instructions in the intermediate representation related to the statement in one of the plurality of code snippets; and
performing, by the one or more processing units, syntactic analysis on the determined one or more instructions to obtain the invocation information of the statement, wherein the statement invocation relation table comprises:
a first column indicating a changed flag, wherein the changed flag is a binary value that indicates whether a respective statement has been changed, and
a second column indicating an affected flag, wherein the affected flag is a binary value that indicates whether a respective statement is affected by the first statement being changed.

3. The computer-implemented method according to claim 1, wherein the method further comprises:
in response to the source code being updated, determining, by the one or more processing units, one or more changed statements based on the updated source code, wherein the one or more changed statements include at least one selected from a group consisting of a newly added statement, a statement invoking a deleted statement, and a statement with a changed assignment.

4. The computer-implemented method according to claim 1, wherein the method further comprises:
generating, by the one or more processing units, a statement representation for the source code, wherein the statement representation includes a tree structure including a plurality of nodes each corresponding to a statement of the source code, and wherein a child node for one node in the tree structure corresponds to a next statement in the source code which is to be executed after a statement corresponding to the one node.

5. The computer-implemented method according to claim 4, wherein the generating the statement representation for the source code comprises:
highlighting the nodes corresponding to at least one of the changed and affected statements based on the statement invocation relation table.

6. The computer-implemented method according to claim 5, wherein the method further comprises:
evaluating, by the one or more processing units, an impact on the source code due to the change of the first statement, based on an impacted path breadth and an impacted path depth of the tree structure,
wherein the impacted path breadth is a count of impacted paths in the tree structure, each of the impacted paths including at least one highlighted node, and the impacted path depth is a maximum depth of impacted paths in the tree structure, a depth of an impacted path being a count of nodes in the impacted path from a first highlighted node to a last highlighted node.

7. The computer-implemented method according to claim 1, wherein the method further comprises:
in response to the first statement being changed, determining, by the one or more processing units, affected test cases for testing the source code based on the statement invocation relation table, wherein a test case invoking a second code snippet which includes the changed first statement and one or more of the affected statements is determined as an affected test case.

8. A system comprising:
a processor set;
one or more computer-readable storage media; and
program instructions stored on the one or more computer-readable storage media to cause the processor set to perform operations comprising:
generating a statement invocation relation table for a source code by parsing intermediate representation of the source code produced by a compiler, wherein the source code includes a plurality of code snippets and each of the code snippets includes a plurality of statements, and wherein for a statement in one of the plurality of code snippets, the statement invocation relation table associates the statement with invocation information of the statement indicating statements and code snippets being invoked by the statement; and
in response to a first statement in a first code snippet of the plurality of code snippets being changed, determining affected statements in the source code due to the change of the first statement based on the statement invocation relation table, wherein the affected statements include a second statement in the first code snippet invoking the first statement and a third statement in a second code snippet invoking the first code snippet.

9. The system according to claim 8, wherein the generating the statement invocation relation table comprises:
determining one or more instructions in the intermediate representation related to the statement in one of the plurality of code snippets; and
performing syntactic analysis on the determined one or more instructions to obtain the invocation information of the statement, wherein the statement invocation relation table comprises:

a first column indicating a changed flag, wherein the changed flag is a binary value that indicates whether a respective statement has been changed, and a second column indicating an affected flag, wherein the affected flag is a binary value that indicates whether a respective statement is affected by the first statement being changed.

10. The system according to claim 8, wherein operations further comprise:

in response to the source code being updated, determining one or more changed statements based on the updated source code, wherein the one or more changed statements include at least one selected from the group consisting of a newly added statement, a statement invoking a deleted statement, and a statement with a changed assignment.

11. The system according to claim 8, wherein the operations further comprise generating a statement representation for the source code, wherein the statement representation includes a tree structure including a plurality of nodes each corresponding to a statement of the source code, and wherein a child node for one node in the tree structure corresponds to a next statement in the source code which is to be executed after a statement corresponding to the one node.

12. The system according to claim 11, wherein the generating the statement representation for the source code comprises:

highlighting the nodes corresponding to at least one of the changed and affected statements based on the statement invocation relation table.

13. The system according to claim 12, wherein the operations further comprises:

evaluating an impact on the source code due to the change of the first statement, based on an impacted path breadth and an impacted path depth of the tree structure, wherein the impacted path breadth is a count of impacted paths in the tree structure, each of the impacted paths including at least one highlighted node, and the impacted path depth is a maximum depth of impacted paths in the tree structure, a depth of an impacted path being a count of nodes in the impacted path from a first highlighted node to a last highlighted node.

14. The system according to claim 8, wherein the operations further comprises:

in response to the first statement being changed, determining affected test cases for testing the source code based on the statement invocation relation table, wherein a test case invoking a second code snippet which includes the changed first statement and one or more of the affected statements is determined as an affected test case.

15. A computer program product comprising:

one or more computer-readable storage media; and program instructions stored on the one or more computer-readable storage media to perform operations comprising:

generating a statement invocation relation table for a source code by parsing intermediate representation of the source code produced by a compiler, wherein the source code includes a plurality of code snippets and each of the code snippets includes a plurality of statements, and wherein for a statement in one of the plurality of code snippets, the statement invocation relation table associates the statement with invocation information of the statement indicating at least one of statements and code snippets being invoked by the statement; and in response to a first statement in a first code snippet of the plurality of code snippets being changed, determining affected statements in the source code due to the change of the first statement based on the statement invocation relation table, wherein the affected statements include a second statement in the first code snippet invoking the first statement and a third statement in a second code snippet invoking the first code snippet.

16. The computer program product of claim 15, wherein the generating the statement invocation relation table comprises:

determining one or more instructions in the intermediate representation related to the statement in one of the plurality of code snippets; and performing syntactic analysis on the determined one or more instructions to obtain the invocation information of the statement, wherein the statement invocation relation table comprises:

a first column indicating a changed flag, wherein the changed flag is a binary value that indicates whether a respective statement has been changed, and a second column indicating an affected flag, wherein the affected flag is a binary value that indicates whether a respective statement is affected by the first statement being changed.

17. The computer program product of claim 15, wherein the operations further comprise:

in response to the source code being updated, determining one or more changed statements based on the updated source code, wherein the one or more changed statements include at least one selected from a group consisting of a newly added statement, a statement invoking a deleted statement, and a statement with a changed assignment.

18. The computer program product of claim 15, wherein the operations further comprise:

generating a statement representation for the source code, wherein the statement representation includes a tree structure including a plurality of nodes each corresponding to a statement of the source code, and wherein a child node for one node in the tree structure corresponds to a next statement in the source code which is to be executed after a statement corresponding to the one node.

19. The computer program product of claim 18, wherein the generating the statement representation for the source code comprises:

highlighting the nodes corresponding to at least one of the changed and affected statements based on the statement invocation relation table.

20. The computer program product of claim 19, wherein the operations further comprise:

evaluating an impact on the source code due to the change of the first statement, based on an impacted path breadth and an impacted path depth of the tree structure, wherein the impacted path breadth is a count of impacted paths in the tree structure, each of the impacted paths including at least one highlighted node, and the impacted path depth is a maximum depth of impacted paths in the tree structure, a depth of an impacted path being a count of nodes in the impacted path from a first highlighted node to a last highlighted node.

* * * * *